(12) United States Patent
Dai et al.

(10) Patent No.: US 9,025,770 B1
(45) Date of Patent: May 5, 2015

(54) DYNAMIC ENCRYPTION ARRANGEMENT WITH A WIRELESS DEVICE AND METHODS THEREFOR

(75) Inventors: WeiChao Dai, Nanjing (CN); Chao Fang, Nanjing (CN); Zhentao Huang, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1608 days.

(21) Appl. No.: 11/770,623

(22) Filed: Jun. 28, 2007

(51) Int. Cl.
*H04K 1/00* (2006.01)
*H04L 9/06* (2006.01)

(52) U.S. Cl.
CPC .................................... *H04L 9/065* (2013.01)

(58) Field of Classification Search
USPC ............... 726/2–5, 17, 21, 27–30; 725/30; 713/150, 161, 165, 180–184, 189; 380/1, 201, 229, 232, 247, 255, 270, 380/37, 28–29; 705/51, 67, 18; 709/201, 709/225, 229, 231–232; 711/163–164, 216; 707/747; 455/3.01, 556.1; 717/126, 717/127, 131, 171–178
See application file for complete search history.

(56) References Cited

U.S. PATENT DOCUMENTS

| | | | | |
|---|---|---|---|---|
| 6,240,184 B1 * | 5/2001 | Huynh et al. | ................. | 380/206 |
| 6,947,556 B1 * | 9/2005 | Matyas et al. | .................. | 380/29 |
| 7,333,609 B2 * | 2/2008 | Kasuya et al. | .................. | 380/46 |
| 7,366,901 B2 * | 4/2008 | Hapamas et al. | ............. | 713/168 |
| 7,418,344 B2 * | 8/2008 | Holtzman et al. | ............. | 701/301 |
| 7,620,027 B2 * | 11/2009 | Igarashi et al. | ............... | 370/341 |
| 7,631,186 B2 * | 12/2009 | Okabe | .......................... | 713/168 |
| 7,724,704 B2 * | 5/2010 | Simons et al. | ................ | 370/329 |

\* cited by examiner

*Primary Examiner* — Joseph P Hirl
*Assistant Examiner* — Leynna Truvan
(74) *Attorney, Agent, or Firm* — IPSG, P.C. Intellectual Property Law

(57) ABSTRACT

A method for encrypting a file using a combination of an electronic device and a protection communication-enabled (PCE) wireless device is provided. The method includes using an encryption/decryption engine executing on the electronic device to encrypt a first flag string, which is a binary string stored in a header of the file, with a digest value to create an encrypted flag string. The digest value is associated with the PCE wireless device, which is a device having a transmission application program installed thereon for enabling interaction between the PCE wireless device and the encryption/decryption engine. The method also includes encrypting at least a portion of the file using the digest value and a first password provided by a user, thereby generating an encrypted file that includes an encrypted version of at least a portion of the file, the encrypted flag string, and the first flag string.

18 Claims, 8 Drawing Sheets

DYNAMIC ENCRYPTION ARRANGEMENT WITH A WIRELESS DEVICE AND METHODS THEREFOR

BACKGROUND OF THE INVENTION

Data is an important resource for individuals and companies. In recent years, due to the sheer volume of data that are usually generated, individual and/or companies are moving away from paper storage and are taking advantage of technology to save data electronically. Since data is now more portable, the need to protect the data from prying eyes has become a greater concern for many individuals and companies.

A common method for protecting data is to password-protect the data. In an example, a file may be protected by a password. To access the file, the user is required to provide the password. Passwords may have different level of complexity. Statistically, most passwords are simple passwords and may be readily guessed by an unauthorized user (e.g., hacker). Even if the passwords are more complex, an unauthorized user may employ brute force attack and/or a dictionary attack to crack the passwords.

Also, the number of passwords that a user may employ to protect his files may be limited to one or a select few. One reason why a user may limit the number of passwords that he may create may be due to his inability to remember a large number of passwords. Thus, once an unauthorized user has identified the set of passwords that a user may employ to protect his data files, the unauthorized user may easily access other data files that may be associated with the same user.

Further, many users are unlikely to change their passwords. In other words, once a user has created a set of passwords, the user is probably going to use the same set of passwords to protect his data files over a long period of time. Unfortunately, most users do not remember to change their passwords unless their passwords have been compromised.

BRIEF SUMMARY OF THE INVENTION

The invention relates, in an embodiment to a method for enabling a user to encrypt a file using a combination of a first electronic device and a first protection communication-enabled (PCE) wireless device. The method includes encrypting, using an encryption/decryption engine executing on the first electronic device, a first flag string of the file with a digest value to create an encrypted flag string. The first flag string is a binary string stored in a header of the file to be encrypted. The digest value is associated with the first PCE wireless device, which is a wireless device having a transmission application program installed thereon for enabling the first PCE wireless device to interact with the encryption/decryption engine. The method also includes encrypting at least a portion of the file using the digest value and a first password provided by the user, thereby generating an encrypted file that includes an encrypted version of the at least a portion of the file, the encrypted flag string, and the first flag string.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
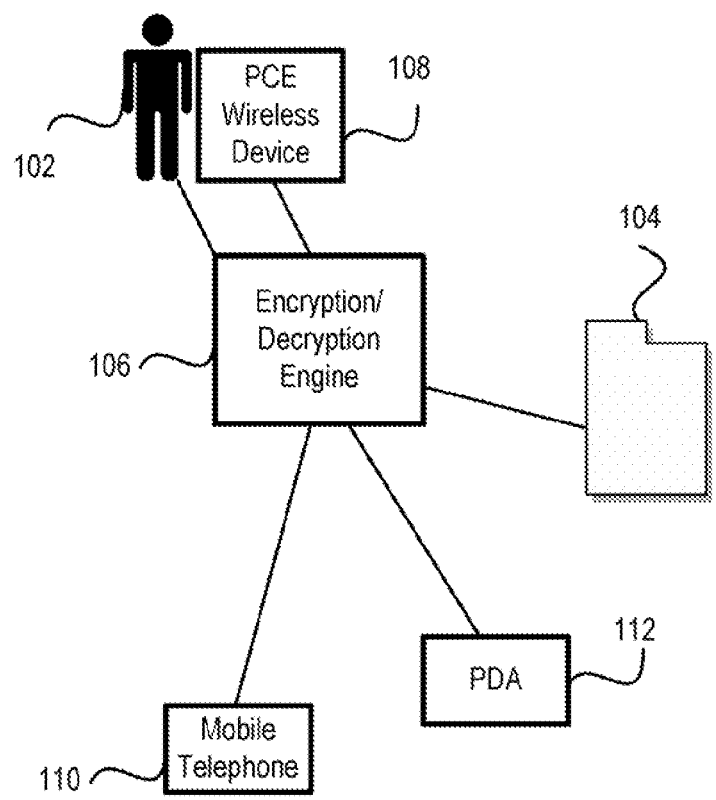
FIG. 1 shows, in an embodiment of the invention, a simple block diagram illustrating a dynamic encryption/decryption arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that as long as a user is required to keep track of a password, the password is most likely to remain a simple unchanging password that a user can easily remember. Although most users are unlikely to create a plurality of passwords to protect files, most users are willing to carry small devices, as can be seen by the proliferation of personal digital assistant (PDA), MP3 players, cellular telephones, and the likes. Thus, the inventors realized that by coupling the encryption/decryption process of a file with a small security device, a more-user friendly encryption/decryption arrangement may be created that may provide files with enhanced secured protection.

In accordance with embodiments of the invention, a dynamic encryption arrangement is provided in which an encryption/decryption engine is employed to encrypt and/or decrypt a data file. As discussed herein, an encryption/decryption engine refers to an application program that is capable of installing and processing an application program. Embodiments of the invention also include a protection communication-enable (PCE) wireless device, which is a separate hardware device that is capable of interacting with the encryption/decryption engine to implement the dynamic encryption arrangement.

In this document, various implementations may be discussed using data file as an example. This invention, however, is not limited to data files and may include any files that may be encrypted. Instead, the discussions are meant as examples and the invention is not limited by the examples presented.

Also, in this document, various implementations may be discussed using Bluetooth device as an example. This invention, however, is not limited to Bluetooth devices and may include any wireless device, especially a device with a unique identification number and capable of transmitting data via a wireless connection.

In an embodiment of the invention, the dynamic encryption arrangement may include an encryption/decryption engine. In an embodiment, encryption/decryption engine may be hosted on an electronic device (e.g., a computer, a laptop, a handheld pocket computer, a PDA, a smart phone, etc.). The encryption/decryption engine is employed to encrypt and/or decrypt a file. In an embodiment, the encryption/decryption engine may include an interface that a user may employ to interact with the encryption/decryption engine.

In an embodiment of the invention, the dynamic encryption arrangement may also include a wireless device. In an embodiment, the wireless device may be a PCE wireless device. As discussed herein, a PCE wireless device is a device with a transmission application program, which may enable the PCE wireless device to interact with the encryption/decryption engine. In an embodiment, the PCE wireless device may be a specialized hardware built to interact with the encryption/decryption engine. In another embodiment, the PCE wireless device may be a smart device (e.g., PDA, mobile telephone, pocket PC, etc.) with the transmission application program.

In an embodiment of the invention, a method for associating an encryption/decryption engine with a PCE wireless device is provided. In an embodiment, a PCE wireless device may be associated with a plurality of encryption/decryption engines. In another embodiment, an encryption/decryption engine may be associated with a plurality of PCE wireless devices. In other words, a PCE wireless device may interact with more than one encryption/decryption engine and an encryption/decryption engine may host a plurality of PCE wireless devices.

To associate a PCE wireless device with an encryption/decryption engine, the encryption/decryption engine may employ a digest algorithm to create a digest value. The encryption/decryption engine may create the digest value by applying the digest algorithm to the PCE wireless device address (i.e., MAC address, Bluetooth address, etc.). Those skilled in the art are familiar with the digest algorithm so no further discussion will be provided. An example of a digest algorithm may include message-digest algorithm 5 (MD5).

In an embodiment of the invention, a method for encrypting a file by employing an encryption/decryption engine and a PCE wireless device is provided. Similar to the prior art, the encryption/decryption engine may request the user to provide a password to protect the file. However, unlike the prior art, the encryption/decryption engine may employ the password as one device for protecting the file. The original file may be encrypted by combining the user's inputted password with the digest value of the PCE wireless device, in an embodiment.

In an embodiment, a flag string may be employed as an indicator that a file has been encrypted. To add an additional protective layer to the file, the encryption/decryption engine may encrypt the flag string, in an embodiment. To encrypt the flag string, the encryption/decryption engine may combine the flag string with the digest value of the PCE wireless device, in an embodiment.

In an embodiment of the invention, a method for decrypting a file is provided. To decrypt the file, the PCE wireless device is required, in addition to the user's inputted password. An encryption/decryption engine may search a file to locate a flag string. If the flag string is not available, the encryption/decryption engine may identify the file as unencrypted.

Next, the encryption/decryption engine may interact with the PCE wireless devices within the proximity to identify PCE wireless device that may have the valid digest value for decrypting the encrypted flag string. Once the encryption/decryption engine is able to identify the valid PCE wireless device, the encryption/decryption engine may create an access code that a user may enter into the PCE wireless device, in an embodiment. Upon receiving the access code, the encryption/decryption engine may compare the address of the PCE wireless device that sent the inputted access code against the address of the valid PCE wireless device. By requiring the user to enter in the access key on a PCE wireless device, another layer of protection is provided against unauthorized access to the encrypted file.

Once the encryption/decryption engine has verified the validity of the PCE wireless device, the encryption/decryption engine may request the user to enter a password for decrypting the encrypted file. The encryption/decryption engine may combine the user's inputted password with the digest value of the PCE wireless device to generate a key. If the password is invalid and/or the digest value is invalid, an invalid key may be generated and the decryption process may end. However, if both the inputted password and the digest value are valid, a valid key may be generated. With a valid key, the encrypted file may be decrypted.

As can be seen, the process of encrypting and decrypting a file may involve processing multiple layers of protection. Thus, an unauthorized user may need access to more than a user's password in order to access an encrypted file. In an embodiment, an internal code may be implemented to provide an additional layer of protection. As discussed herein, an internal code refers to a unique identifier that may be associated with a PCE wireless device to prevent unauthorized replication of the PCE wireless device address. Thus, even if an unauthorized user is somehow able to get access of a PCE wireless device address, the unauthorized user can still not gain access to the encrypted file since the unauthorized user may not have access to the unique internal code.

The features and advantages of the present invention may be better understood with reference to the figures and discussions that follow.

FIG. 1 shows, in an embodiment of the invention, a simple block diagram illustrating a dynamic encryption arrangement. Consider the situation wherein, for example, a user 102 wants to encrypt a file 104. To begin the encryption process, user 102 may employ an encryption/decryption engine 106 to encrypt file 104. In an example, user 102 may log onto a computer system and initialize encryption/decryption engine 106. As discussed herein, an encryption/decryption engine refers to an application program that is employed to encrypt and/or decrypt a file. As can be appreciated, the encryption/decryption engine may be installed on an electronic device (e.g., a computer, a laptop, a handheld pocket computer, a PDA, a smart phone, etc.).

To facilitate the encryption and/or decryption process, encryption/decryption engine 106 may include an interface enabling user 102 to interact with encryption/decryption engine 106, in an embodiment. In an example, user 102 may utilize the interface of encryption/decryption engine 106 to identify the file user 102 may want to encrypt.

Once encryption/decryption engine 106 has been activated, encryption/decryption engine 106 may perform a search for available wireless devices (e.g., Bluetooth devices). In an example, encryption/decryption engine 106 may discover that a plurality of wireless devices (e.g., a PCE wireless device 108, a mobile telephone 110, and a PDA 112) is within close proximity. As can be appreciated, the number of wireless devices that encryption/decryption engine 106 may be able to identify may depend upon the wireless signal strength of the wireless device. In an example, a wireless headset worn by a person 10 feet away may not be able to emit wireless signal strength beyond 5 feet. As a result, encryption/decryption engine 106 may not include the wireless headset on the list of potential wireless devices since the wireless signal strength may be too weak for encryption/decryption 106 to detect.

In an embodiment, encryption/decryption engine 106 may provide user 102 with a list of available wireless devices from which user 102 may select the preferred wireless device to be employed for encrypting file 104, in an embodiment, the address associated with each wireless device may be listed. To facilitate the selection process, each address may be accompanied by a reference number, enabling the user to quickly identify the desired wireless device.

In an embodiment, a wireless device may be employed to interact with encryption/decryption engine 106. In an embodiment, the wireless device may be a protection communication-enabled (PCE) wireless device. As discussed herein, a PCE wireless device refers to a wireless device with a transmission application program installed. As discussed herein, a transmission application program refers to an application program that may enable a wireless device to interact with an encryption/decryption engine.

To illustrate how an encryption/decryption engine may interact with a PCE wireless device to perform encryption and/or decryption, the next few figures may be employed to illustrate the steps for performing the initiation, encryption, and decryption processes.

Figure 2:
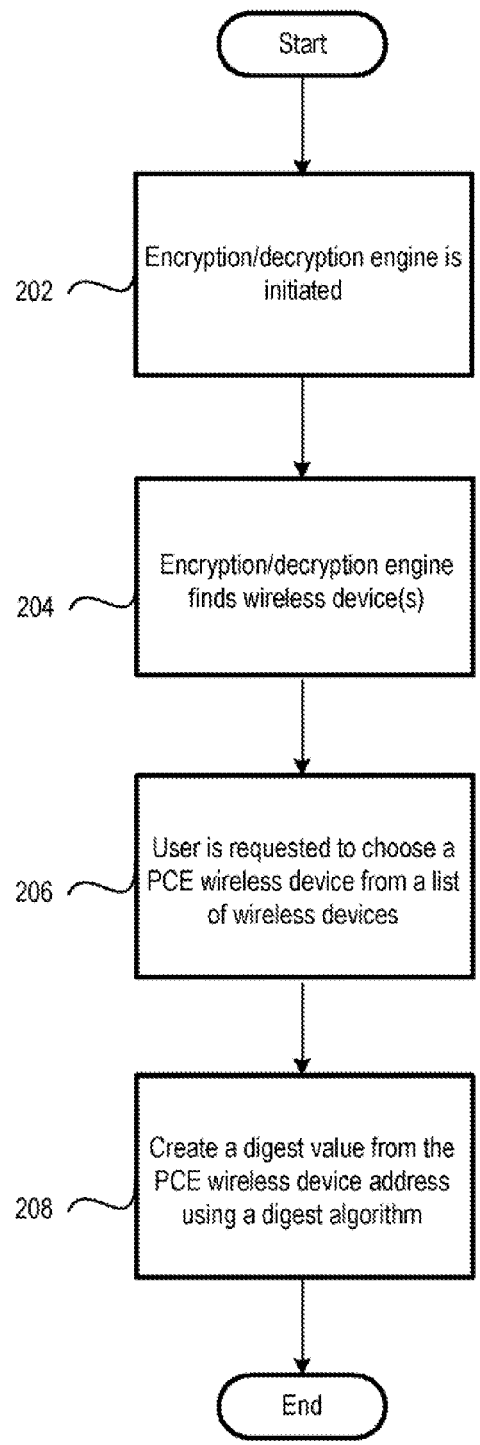
FIG. 2 shows, in an embodiment of the invention, a simple flowchart illustrating the method steps for associating an encryption/decryption engine with a PCE wireless device.

FIG. 2 shows, in an embodiment of the invention, a simple flowchart illustrating the method steps for associating an encryption/decryption engine with a PCE wireless device.

At a first step 202, an encryption/decryption engine is initiated. Consider the situation wherein, for example, a user may want to associate a PCE wireless device with an encryption/decryption engine.

At a next step 204, the encryption/decryption engine may search for available wireless devices. As aforementioned, the number of wireless devices that encryption/decryption engine 106 may be able to detect may depend upon the wireless signal strength of the wireless device. In an example, most Bluetooth devices may have a range of 50 feet to about 165 feet. Thus, Bluetooth devices located further than 165 feet from the electronic device that is hosting the encryption/decryption engine may not be detected by the encryption/decryption engine. Once the encryption/decryption engine has identified the available wireless devices, the encryption/decryption engine may create a list of the available wireless devices.

At a next step 206, the user may select a PCE wireless device from the list provided by the encryption/decryption engine. As can be appreciated, not all wireless device identified may be capable of interacting with the encryption/decryption engine to protect a file. In an embodiment, the wireless device may be an electronic device with a component that enables an alphanumeric string to be entered. In an embodiment the wireless device may be a PCE wireless device capable of interacting with the encryption/decryption engine.

At a next step 208, the encryption/decryption engine may create a digest value that may be associated with the selected PCE wireless device. In an embodiment, the encryption/decryption engine may be configured to employ a digest algorithm in combination with the PCE wireless device address (e.g., Bluetooth address) to create a digest value that is unique to the PCE wireless device. Those skilled in the arts are familiar with digest algorithm, such as MD5; therefore, no further discussion will be provided. In an embodiment, the digest value may be stored in a database located within the encryption/decryption engine.

In an embodiment, an encryption/decryption engine may be configured to be associated with a plurality of PCE wireless device. In an embodiment, a PCE wireless device may be associated with a plurality of encryption/decryption engines. For each PCE wireless device, the encryption/decryption engine may create a unique digest value.

Figure 3:
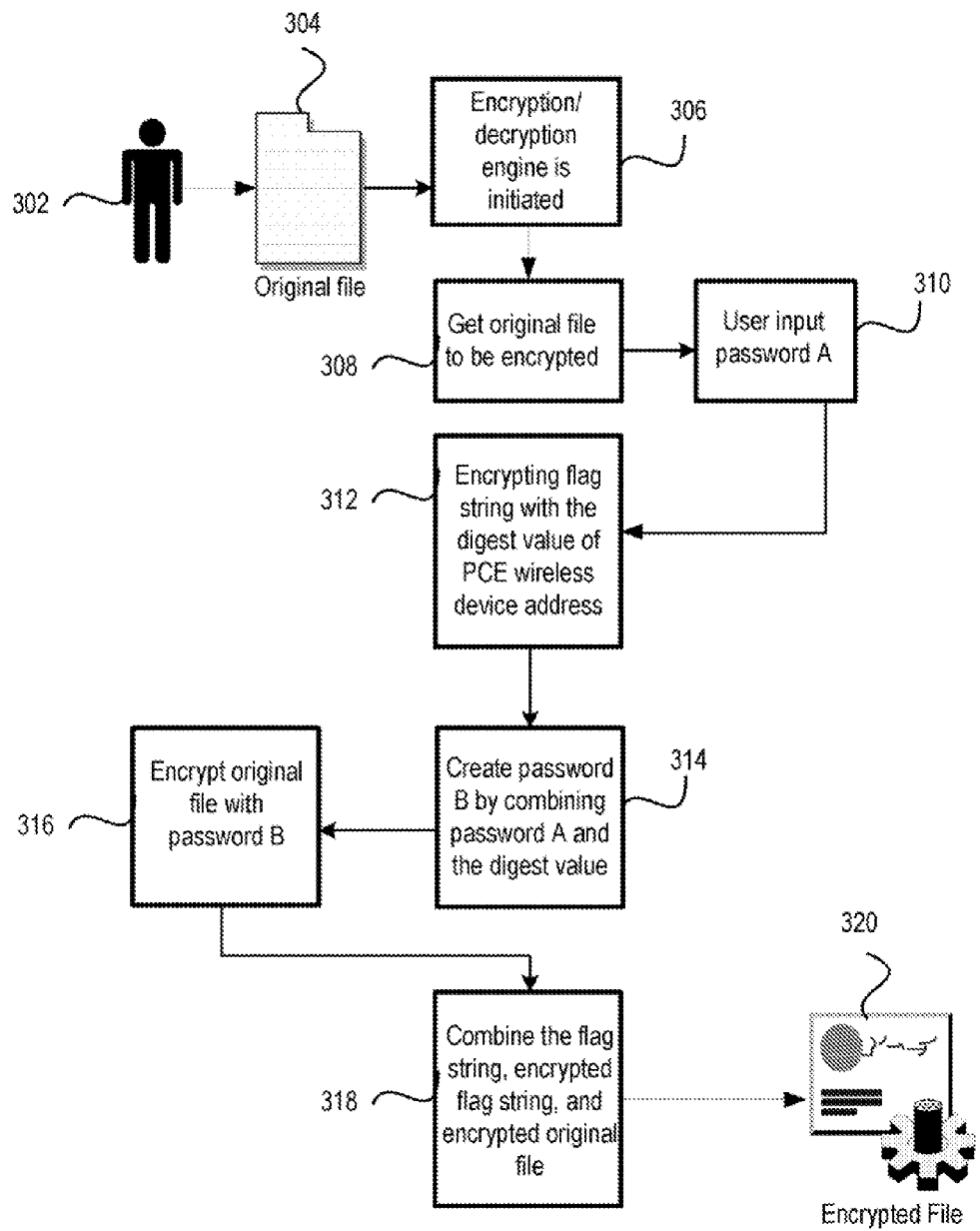
FIG. 3 shows, in an embodiment of the invention, a simple flowchart illustrating an example of the encryption process.

FIG. 3 shows, in an embodiment of the invention, a simple flowchart illustrating an example of the encryption process. Consider the situation wherein, for example, a user 302 may want to encrypt an original file 304.

At a first step 306, a user may initiate an encryption/decryption engine. In an example, user 302 may log onto an electronic device, such as a computer, to initiate the encryption/decryption engine. In an embodiment, the encryption/decryption engine may be shown as a user interface enabling user 302 to interact with the encryption/decryption engine.

At a next step 308, user 302 may employ the encryption/decryption engine to bring in original file 304 to begin the encryption process. In other words, user 302 may select the file he may want to encrypt.

At a next step 310, user 302 may enter a password A to protect original file 304. In the prior art, the process of protecting the file may be limited to just encrypting the file after the user provides the password. However, with embodiments of the invention, additional steps may be implemented in order to prevent unauthorized users from accessing the file, even if the user may somehow gain access to the user's password.

At a next step 312, the encryption/decryption engine may encrypt a flag string with the digest value associated with the address of the PCE wireless device. The steps for identifying the PCE wireless device that may be employed in the encryption process are similar to the steps described in FIG. 2. In an example, the encryption/decryption engine may perform a search for available wireless devices and may display a list for user 302 to make a selection. Once the PCE wireless device has been identified, the encryption/decryption engine may utilize the digest value associated with the PCE wireless device to encrypt the flag string. As can be appreciated, the digest value may be retrieved from a database of pre-calculated digest values or may be calculated in real-time.

As aforementioned, with the digest value, the encryption/decryption engine may encrypt the flag string, which is a binary string that provides detail about the file being encrypted. The flag string is usually located in the header of the file. In an embodiment, the encryption/decryption engine may employ an encryption algorithm, such as advanced encryption standard, to combine the flag string of original file 304 with the digest value of the PCE wireless device to encrypt the flag string to create an encrypted flag string.

At a next step 314, a password B may be created by combining the user inputted password A with the digest value of the PCE wireless device.

At a next step 316, the encryption/decryption engine may employ password B to encrypt original file 304. In an embodiment, the encryption algorithm may be a simple algorithm, such as appending password B to the digest value of the PCE wireless device. In another embodiment, the encryption algorithm may be a complex algorithm, such as an advanced encryption standard.

At a next step 318, an encrypted file 320 may be generated by combining the flag string with the encrypted flag string and the encrypted original file.

Figure 4:
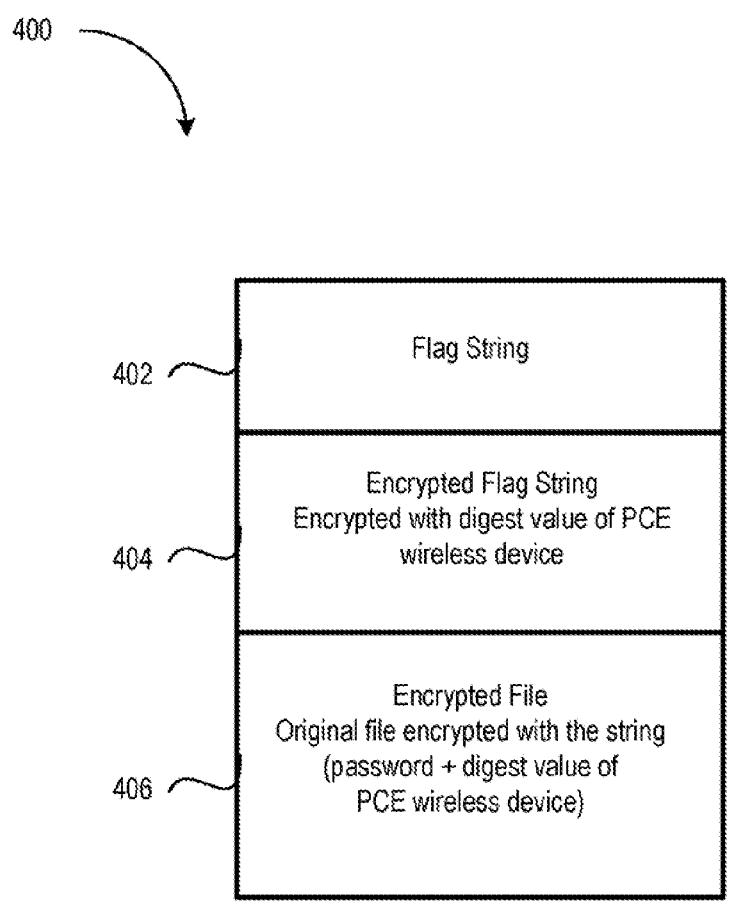
FIG. 4 shows, in an embodiment of the invention, a simple block diagram of an example of an arrangement of an encrypted file.

FIG. 4 shows, in an embodiment of the invention, a simple block diagram of an example of an arrangement of an encrypted file. Encrypted file 400 may include a flag string 402 located in the header of the file. Located after flag string 402 is an encrypted flag string 404. As aforementioned, encrypted flag string 404 is flag string 402 in combination with a digest value of a PCE wireless device. Located after encrypted flag string 404 is an encrypted original file, which may be the original file encrypted with the user's inputted password and the digest value associated with the PCE wireless device.

Figure 5A:
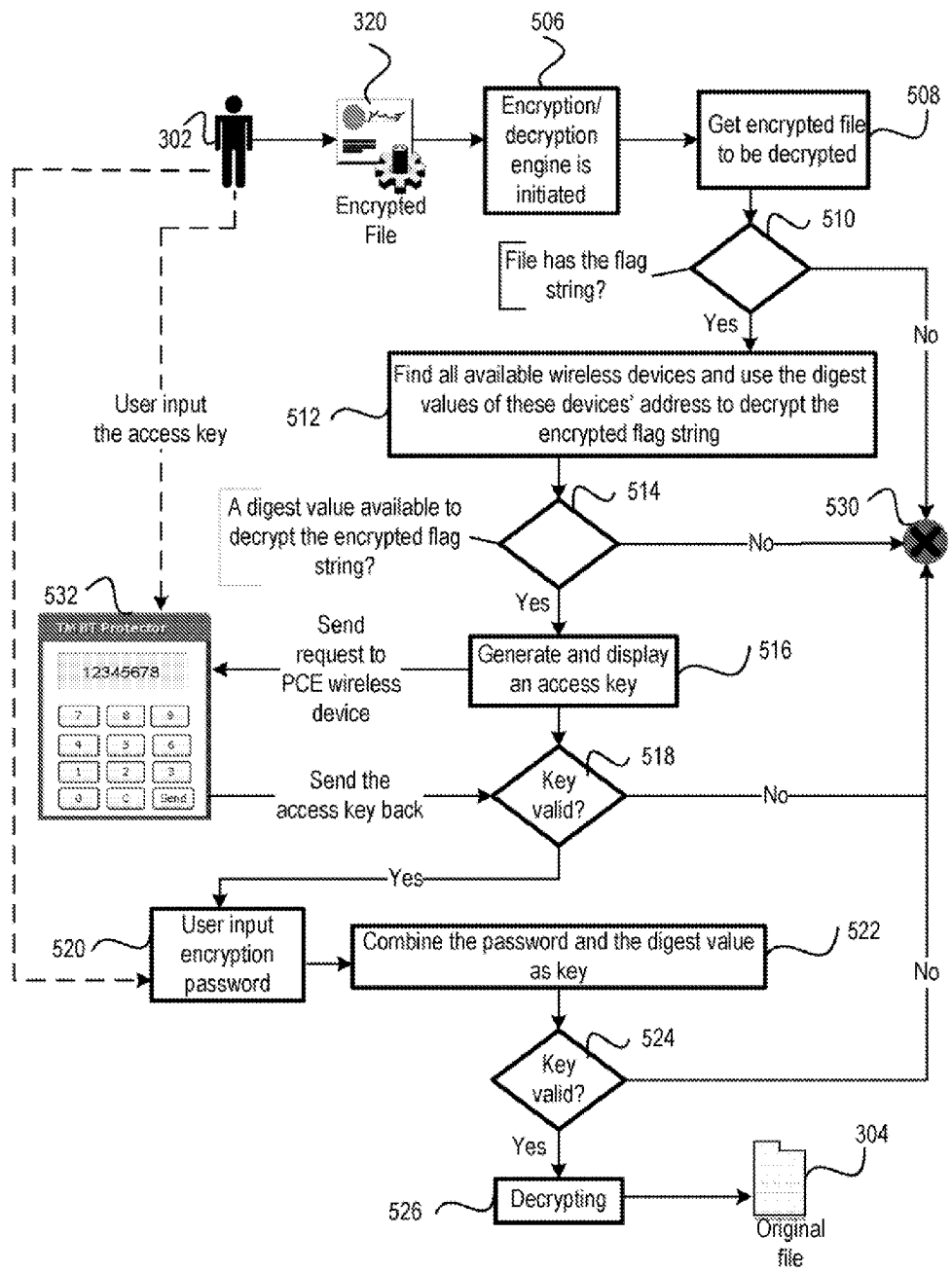
FIG. 5A shows, in an embodiment of the invention, a simple flowchart illustrating an example of a decryption process.

FIG. 5A shows, in an embodiment of the invention, a simple flowchart illustrating an example of a decryption process. Consider the situation wherein user 302 wants to decrypt encrypted file 320.

At a first step 506, an encryption/decryption engine is initiated. In an example, user 302 may log onto an electronic device, such as a computer, to initialize the encryption/decryption engine.

At a next step 508, the encrypted file that is to be decrypted is retrieved by the encryption/decryption engine.

At a next step 510, the encryption/decryption engine may be employed to check the encrypted file to determine the existence of a flag string. In an embodiment, the flag string may be in the header of the encrypted file.

If the flag string is not detected by the encryption/decryption engine, then at a next step 530, the decryption process is terminated. In other words, if the encryption/decryption engine is unable to locate a flag string in the file, then the encryption/decryption engine may assume that the file has not been encrypted.

If a flag string is identified by the encryption/decryption engine, then at a next step 512, the encryption/decryption engine may search for available wireless devices. The encryption/decryption engine may utilize the digest value associated with each wireless device to decrypt an encrypted flag string that has been employed to protect the encrypted file. In an embodiment, the encrypted/decryption engine may apply a digest algorithm to calculate in real time the digest value for a wireless device.

At a next step 514, if a digest value that is capable of decrypting the encrypted flag string is not available, then the decryption process may be terminated at next step 530. In an example, if an unauthorized user is trying to access the encrypted file, the encrypted file may not be accessible since the unauthorized user may not have the PCE wireless device that is needed to decrypt the encrypted file.

However, if at next step 514, a digest value that is capable of decrypting the encrypted flag string is available, then the encrypted flag string is decrypted. In other words, if the decrypted flag string matches the flag string, then the digest value is correct.

At a next step 516, the encryption/decryption engine may create an access key and display the access key. In an embodiment, the access key may be a randomly-generated key. After the access key has been generated, the encryption/decryption engine may send a signal to the PCE wireless device. In an embodiment, the signal may be a mean of communicating with the user of the PCE wireless device. Examples of a signal may include, but are not limited to, a beep, a blinking light, and the likes. Upon receiving the signal, the user of PCE wireless device 532 may enter the access key into PCE wireless device 532.

Figure 5B:
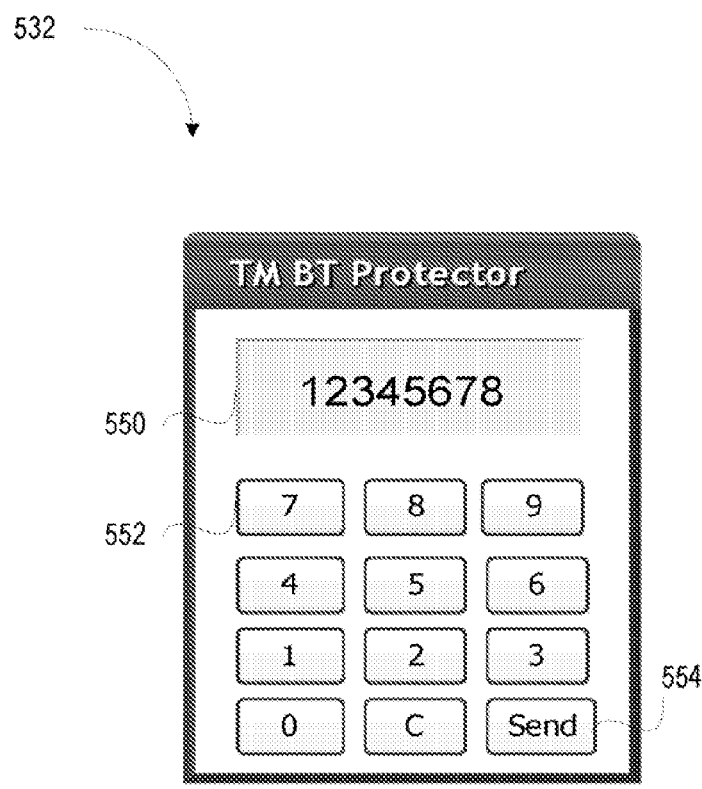
FIG. 5B shows, in an embodiment of the invention, an example of a PCE wireless device.

FIG. 5B shows, in an embodiment of the invention, an example of a PCE wireless device, such as PCE wireless device 532. As aforementioned. PCE wireless device 532 may be a specialized hardware with a built-in transmission application program that enables PCE wireless device 532 to interact with the encryption/decryption engine. In another embodiment. PCE wireless device 532 may be a smart device, such as a smart phone, with the transmission application program installed.

PCE wireless device 532 may include a visual display screen 550. PCE wireless device 532 may also include components for entering the access key. In an example, PCE wireless device 532 may include buttons 552. Once the access key has been entered, a send component, such as send button 554, may be employed to send the entered access key to the encryption/decryption engine.

Referring back to FIG. 5A, once the user has sent the access key back to the encryption/decryption engine, at a next step 518, the encryption/decryption engine may verify that the address of the PCE wireless device that sent the access key is valid. Accordingly, the access key may provide another layer of protection against unauthorized users from accessing an encrypted file. In an example, user B has gained access to a confidential encrypted file of his neighbor. In addition, user B has knowledge of the password that has been utilized to encrypt the file. However, since user B does not actually have possession of the PCE wireless device, user B is unable to enter in the access key from the valid PCE wireless device. As a result, user B is unable to gain access to the encrypted file.

If the incoming access key is coming from an invalid address of a PCE wireless device. then the decryption process may be terminated at next step 530.

However, if the incoming access key is associated with the valid address of the PCE wireless device, then at a next step 520, user 302 may be requested to enter in a password. In an example, user 302 entered in password A to encrypt original file 304 in FIG. 3. To decrypt encrypted file 320, user 302 may have to enter the same password A.

At a next step 522, the encryption/decryption engine may combine the user's entered password with the digest value of the PCE wireless device to create a key. In an example, encryption/decryption engine may employ an encryption algorithm to combine password A with the digest value of PCE wireless device 532 to generate a key.

At a next step 524, the encryption/decryption engine make a determination on whether or not the key matches the password B generated during step 314 of FIG. 3. If the key is not valid, then the decryption process may be terminated at next step 530.

However, if the key is valid, then at a next step 526, encrypted file 320 is decrypted and original file 304 is available to user 302.

As can be seen by FIGS. 3 and 5A, embodiments of the invention combine a file with a specified PCE wireless device. Thus, even if an unauthorized user gains access to the user's password, the unauthorized user is unable to access the encrypted file without gaining access to the PCE wireless device that has been employed to encrypt the file. Also, since the encrypted file does not store the PCE wireless device address, an unauthorized user may be unable to gain access to the PCE wireless device address from the encrypted file. Thus, the likelihood that a PCE wireless device is replicated with the correct address is highly unlikely. As a result, the risk that an encrypted file may be hacked due to a user's habit of employing fairly uncomplicated password that is rarely changed may be minimized since an encrypted file may not be decrypted without a valid PCE wireless device.

Figure 6:
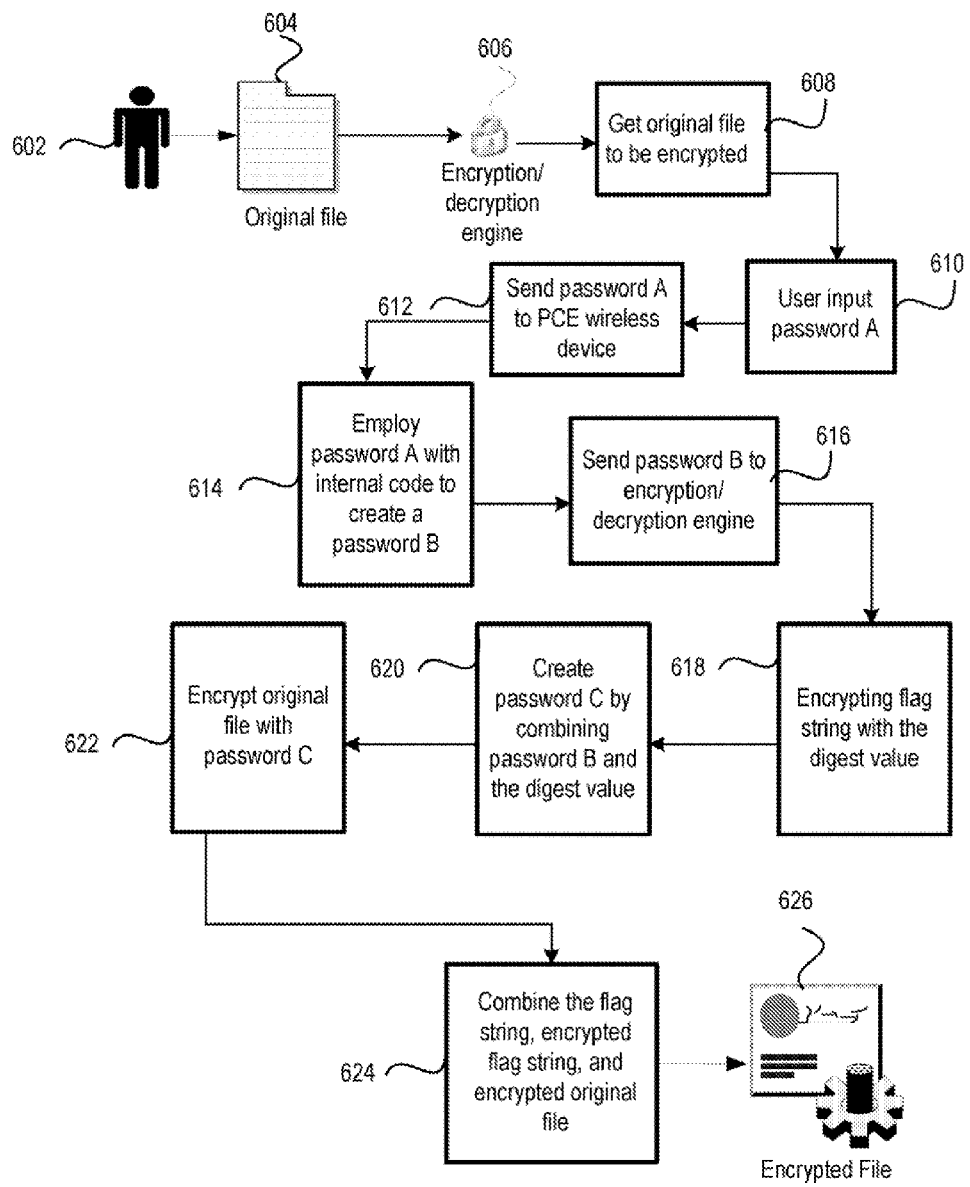
FIG. 6 shows, in an embodiment of the invention, a simple flow chart illustrating an example of an encryption process utilizing a PCE wireless device with an internal code.
Figure 7:
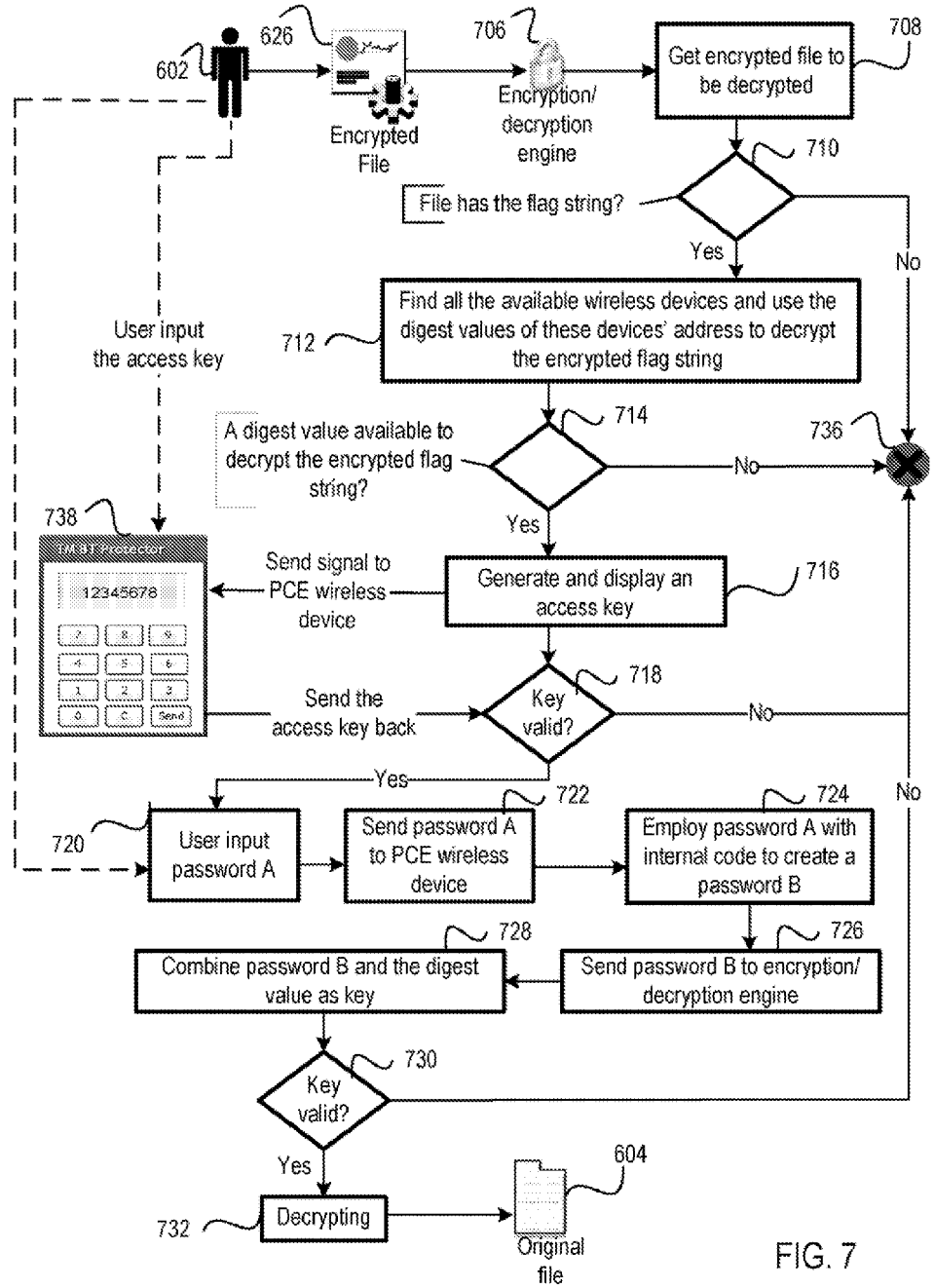
FIG. 7 shows, in an embodiment of the invention, another implementation of a decryption process.

In an embodiment, an additional security enhanced identifier may be associated with a PCE wireless device in order to reduce the risk of the PCE wireless device being replicated. In an embodiment, the additional security enhanced identifier may be a unique internal code for each PCE wireless device. The internal code may be preset for an electronic device that is a dedicated PCE wireless device, in an embodiment. In another embodiment, the internal code may be assigned to a wireless device when an application program that enables the wireless device to interact with the encryption/decryption engine is installed. FIGS. 6 and 7 will be employed to illustrate how the internal code may be utilized to encrypt and/or decrypt a file.

FIG. 6 shows, in an embodiment of the invention, a simple flow chart illustrating an example of an encryption process utilizing a PCE wireless device with an internal code. Consider the situation wherein, for example, a user 602 wants to encrypt an original file 604.

At a first step 608, user 602 may employ an encryption/decryption engine 606 to retrieve original file 604 for encryption.

At a next step 610, encryption/decryption engine 606 may request user 602 to enter a password A.

At a next step 612, the encryption/decryption engine may send the password to the PCE wireless device.

At a next step 614, the PCE wireless device may employ a digest algorithm to combine password A with an internal code to create a password B. In an embodiment, a unique internal code may be associated with each PCE wireless device. As aforementioned, the internal code may be preset if the PCE wireless device is a specialized hardware and may be assigned if the PCE wireless device is a wireless device with a transmission application program.

At a next step 616, the PCE wireless device may send password B to encryption/decryption engine 606.

At a next step 618, encryption/decryption engine 606 may encrypt a flag string with the digest value associated with the address of the PCE wireless device. In an embodiment, encryption/decryption engine 606 may employ an encryption algorithm, such as advanced encryption standard, to combine the flag string of original file 604 with the digest value of the PCE wireless device to encrypt the flag string to create an encrypted flag string.

At a next step 620, the encryption/decryption engine may employ password B with the digest value of the PCE wireless device to create a password C. In an embodiment, an encryption algorithm may be employed to create password C.

At a next step 622, encryption/decryption engine 606 may employ password C to encrypt original file 604.

At a next step 624, an encrypted file 626 may be generated by combining the flag string of the original file with the encrypted flag string and the encrypted original file.

FIG. 7 shows, in an embodiment of the invention, another implementation of a decryption process. The decryption steps described may be implemented to decrypt file encrypted with a PCE wireless device with an internal code, as described in FIG. 6. Consider the situation wherein, for example, user 602 wants to decrypt encrypted file 626.

At a first step 708, user 602 may employ an encryption/decryption engine 706 to retrieve encrypted file 626.

At a next step 710, encryption/decryption engine 706 may check encrypted file 626 to determine the existence of a flag string.

If a flag string does not exist, then at a next step 736, the decryption process may be terminated.

However, if a flag string is identified, then at a next step 712, encryption/decryption engine 606 may identify available wireless devices and may employ the digest value associated with each wireless device to decrypt encrypted file 626.

At a next step 714, encryption/decryption engine 706 may check to see if any of the available digest value is capable of decrypting the encrypted flag string. If no digest value is valid, then the decryption process may be terminated at next step 736.

However, if a digest value is valid, then the digest value is employed to decrypt the encrypted flag string. In other words, after the decryption, the encrypted flag string matches the flag string.

At a next step 716, encryption/decryption engine 706 may be employed to create an access key. Once the access key has been generated, encryption/decryption engine 706 may send a signal to a PCE wireless device 738 to notify user 602. In an example, the user may enter the access key, which may be visually displayed on a screen, into PCE wireless device 738.

Once the inputted access key has been sent back to encryption/decryption engine 606, at a next step 718, encryption/decryption engine 706 may determine the validity of the inputted access key. As can be appreciated, since the encryption/decryption engine has already identified the valid address of the actual PCE wireless device that have been utilized to encrypt the file, the encryption/decryption engine is able to determine the validity of the access key by comparing the address associated with the inputted access key with the valid address of the actual PCE wireless device.

If the key is not valid, then the decryption process is terminated at next step 736. By implementing the access key, the dynamic encryption arrangement provides an addition layer of protection against unauthorized access to an encrypted file.

If a match is identified, then at a next step 720, encryption/decryption engine 706 may request user 602 to enter in his password. In an example, the password entered at this step should match password A entered during step 610 of the encryption process.

At a next step 722, the encryption/decryption engine may send the user's inputted password to the PCE wireless device, in an example, encryption/decryption engine 706 may send password A to PCE wireless device 738.

At a next step 724, the PCE wireless device is configured to employ a digest algorithm to combine the user's inputted password with an internal code to generate a password B. As aforementioned, each PCE wireless device may be associated with a unique internal code. In an embodiment, password B generated at this step may match the password generated at step 614 of the encryption process.

At a next step 726, the PCE wireless device may send newly generated password (i.e., password B) to encryption/decryption engine 706.

At a next step 728, the encryption/decryption engine may employ an encryption algorithm to combine the newly generate password with the digest value of the PCE wireless device to generate a new key. In an example, encryption/decryption engine may combine password B with the digest value of PCE wireless device 738 to create a password C.

At a next step 730, the encryption/decryption engine may verify the validity of the key. In an example, encryption/decryption engine 706 may compare password C created in step 728 against password C created in step 620 of the encryption process.

If the key is not valid, then the decryption process may be terminated at next step 736. However, if the key is valid, then at a next step 732, encrypted file 626 is decrypted and original file 604 is available to the user.

As can be seen by FIGS. 6 and 7, by employing an internal code for each PCE wireless device, a further level of protection may be provided to protect the file from unauthorized user. Thus, even if an unauthorized user is able to replicate a PCE wireless device with the correct address, the PCE wireless device may not be employed to gain access to the encrypted file since the PCE wireless device does not have the required internal code. As a result, by implementing the unique internal code, another layer of protection is provided in the protection of confidential files.

As can be appreciated from the forgoing, one or more embodiments of the present invention provide for a dynamic encryption arrangement. The dynamic encryption arrangement reduces the risk of unauthorized viewing of confidential files since this arrangement combined an encrypted file with a PCE wireless device. As a result, the likelihood of an unauthorized user accessing an encrypted file is minimized since the unauthorized user is no longer able to decrypt a file with just a password.

Also, the cost of implementing the dynamic encryption arrangement is relatively inexpensive. Most users may already have a smart device and can easily convert the smart device to a PCE wireless device by installing a transmission application program. As discussed herein, a transmission application program refers to an application program that may be installed onto a wireless device to enable the wireless device to interact with an encryption/decryption engine. Even if a user does not possess a smart device, the PCE wireless device is a simple electronic device that can be inexpensively manufactured.

Further, the dynamic encryption arrangement may be implemented without requiring the user to become familiar with a complicated process. Instead, the dynamic encryption arrangement demands no additional action from the user except for having the PCE wireless device available during the encryption/decryption process. Since the PCE wireless device is a small device that the user may easily carry with him and, in some cases, the PCE wireless device may be a smart device that the user may already carry with him, the user is not inconvenienced by the dynamic encryption arrangement. Instead, the dynamic encryption arrangement provides more enhanced encryption protection for files without requiring the user to remember long complicated passwords that may have to be constantly changed.

In addition, the dynamic encryption process enables a company to control accessibility to confidential files. Consider the situation wherein, for example, a confidential file is sent out to a set of individuals. Usually when a confidential file is distributed to a set of individuals, the technology administrator of the company may provide the set of individuals with a password to enable the individuals to access the protected file.

Unfortunately, in the prior art, once a confidential file has been distributed with the password, a company is usually unable to control how the file is accessed. In other words, the individual may view the file at any location. Further, the individual may share his password with other users without the company's approval or knowledge. In addition, if the confidential file is lost and/or stolen, an illegal user may access the confidential file without the company ever being aware of the situation, especially if the authorized user fails to report the incident. Thus, once a password has been issued, the company may no longer retain control of the confidential file.

With the dynamic encryption arrangement, the company may retain control over accessibility to a confidential file. In the example above, the set of individuals are not able to view the confidential file without having access to a PCE wireless device that has been employed to encrypt the confidential file. To control access to the confidential file, the company may place the PCE wireless device in a location that is limited to a few select individuals. Also, the company may make the PCE wireless device available at only specific time. Thus, the company may retain control of the confidential file by limiting access to the PCE wireless device.

As a result, by implementing the dynamic encryption arrangement and methods thereof, a more enhanced encryption and/or decryption arrangement may be provided for protecting confidential files. The methods of implementing the dynamic encryption arrangement are user-friendly and substantially eliminate the need for a user to remember complicated password and/or to constantly change his password. Further, the implementation of a PCE wireless device requires minimal investment from the user to enable the dynamic encryption arrangement. Thus, with the dynamic encryption arrangement, the risk of an encrypted confidential file being accessed by unauthorized users is substantially minimized.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for enabling a user to perform encryption on a file using a combination of an electronic device and a wireless device, said method comprising:

ascertaining the availability of said wireless device, said wireless device representing a protection communication-enable (PCE) wireless device working cooperatively with said electronic device for performing said encryption;

said wireless device is available for said performing said encryption, performing at least steps a) to c) below a) applying a digest algorithm to an address of said wireless device to calculate a digest value associated with said address of said wireless device, said address of said wireless device being a unique identifier associated with said wireless device;

b) encrypting, using an encryption/decryption engine executing on said electronic device and using said digest value, a first flag string to create an encrypted flag string, said first flag string being employed for indicating that said file has been encrypted, said wireless device having a transmission application program installed thereon for enabling said wireless device to interact with said encryption/decryption engine; and c) encrypting at least a portion of said file using said digest value and a first password provided by said user, thereby generating an encrypted file that includes at least an encrypted version of said at least a portion of said file, said encrypted flag string, and said first flag string, further comprising combining said first password with said digest value to create a second password, wherein said encrypting said at least a portion of said file including using said second password.

2. The method of claim 1 wherein said encryption/decryption engine is configured to be associated with a set of wireless devices, said method further comprising identifying said wireless device among said set of wireless devices.

3. The method of claim 1 wherein an advanced encryption standard is employed to encrypt said file.

4. The method of claim 1 wherein said address of said wireless device is a Bluetooth address.

5. A method for performing decryption of an encrypted file using a combination of an electronic device and a wireless device, said method comprising:

ascertaining the availability of said wireless device, said wireless device representing a protection communication-enable (PCE) wireless device working cooperatively with said electronic device for performing said decryption;

said wireless device is available for said performing said decryption, performing at least steps a) to d) below a) applying a digest algorithm to an address of said wireless device to calculate a digest value associated with said address of said wireless device, said address of said wireless device being a unique identifier associated with said wireless device;

b) decrypting, using an encryption/decryption engine executing on said electronic device and using said digest value, an encrypted flag string of said encrypted file to obtain a decrypted flag string, said wireless device having a transmission application program installed thereon for enabling said wireless device to interact with said encryption/decryption engine;

c) determining whether said decrypted flag string matches a first flag string, said first flag string being employed for indicating that said encrypted file has been encrypted; and d) decrypting at least a portion of said encrypted file using at least a first password and said digest value, said first password being supplied by a user.

6. The method of claim 5 wherein said encryption/decryption engine is configured to be associated with a set of wireless devices, said method further comprising identifying said wireless device among said set of wireless devices.

7. The method of claim 5 further comprising:
combining said first password with said digest value to generate a key; and
determining whether said key matches a second password before decrypting said encrypted file.

8. The method of claim 5 wherein an advanced encryption standard is employed to decrypt said file.

9. The method of claim 5 further comprising:
after determining that said decrypted flag string matches said first flag string, generating a first access key using said encryption/decryption engine and displaying said first access key using said electronic device, said first access key being a random string;
notifying said wireless device upon generating said first access key;
receiving a second access key from said wireless device; and
determining whether said second access key matches said first access key before performing said decrypting said at least a portion of said encrypted file.

10. The method of claim 5 further comprising: combining said first password with an internal code to generate a second password, said internal code being a second unique identifier associated with said wireless device, said second password being combined with said digest value to decrypt said at least a portion of said encrypted file.

11. The method of claim 5 wherein said address of said wireless device is a Bluetooth address.

12. A method for protecting a file, said method comprising:
ascertaining the availability of a wireless device, said wireless device representing a protection communication-enable (PCE) wireless device working cooperatively with a electronic device for performing said protecting;
said wireless device is available for said performing said protecting, performing at least steps a) to f) below
a) executing an-encryption/decryption engine on said electronic device, said encryption/decryption engine being configured to perform at least one of encryption and decryption;
b) using said encryption/decryption engine to calculate a first copy of a digest value by applying a digest algorithm to an address of said wireless device, said address of said wireless device being a unique identifier associated with said wireless device that is related to said address of wireless device;
c) applying said first copy of said digest value to encrypt a first flag string of said file to obtain an encrypted flag string, said first flag string being employed for indicating that said file has been encrypted;
d) encrypting at least a portion of said file to create an encrypted file, said encrypted file including at least an encrypted version of said at least a portion of said file, said encrypted flag string, and said first flag string;
e) using said encryption/decryption engine to calculate a second copy of said digest value by applying said digest algorithm to said address of said wireless device; and
f) applying said second copy of said digest value to decrypt said encrypted flag string.

13. The method of claim 12 further comprising: locating a plurality of wireless devices and presenting a list of said plurality of wireless device to a user;
accepting an entry from said user, said entry being related to selecting said wireless device from said plurality of wireless devices; and encrypting said at least a portion of said file using said first copy of said digest value and a first password provided by said user, thereby generating said encrypted file.

14. The method of claim 12 further comprising: decrypting at least a portion of said encrypted file using at least a first password and said second copy of said digest value, said first password being supplied by a user.

15. The method of claim 12 further comprising:
generating a first access key, using said encryption/decryption engine, said first access key being a random string;
displaying said first access key using said electronic device;
notifying said wireless device upon generating said first access key;
receiving a second access key from said wireless device; and determining whether said second access key matches said first access key before decrypting said encrypted file.

16. The method of claim 12 wherein said encryption/decryption engine is configured to employ an advanced encryption standard in performing said at least one of said encryption and said decryption.

17. The method of claim 12 wherein said address of said first device is a Bluetooth address.

18. The method of claim 12 further comprising: combining a first password with an internal code to generate a second password, said internal code being a second unique identifier associated with said wireless device; and applying said second password with at least one of said first copy of said digest value and said second copy of said digest value to perform at least one of said encryption and said decryption, said internal code being assigned to said wireless device when an application program that enables said wireless device to interact with said encryption/decryption engine is installed.

* * * * *